United States Patent Office.

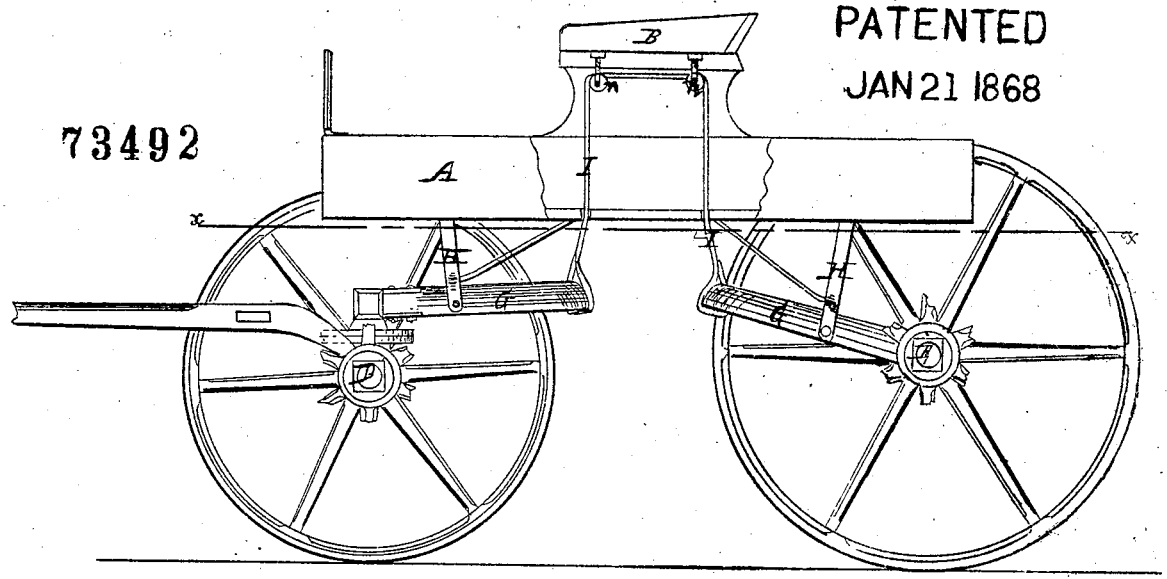
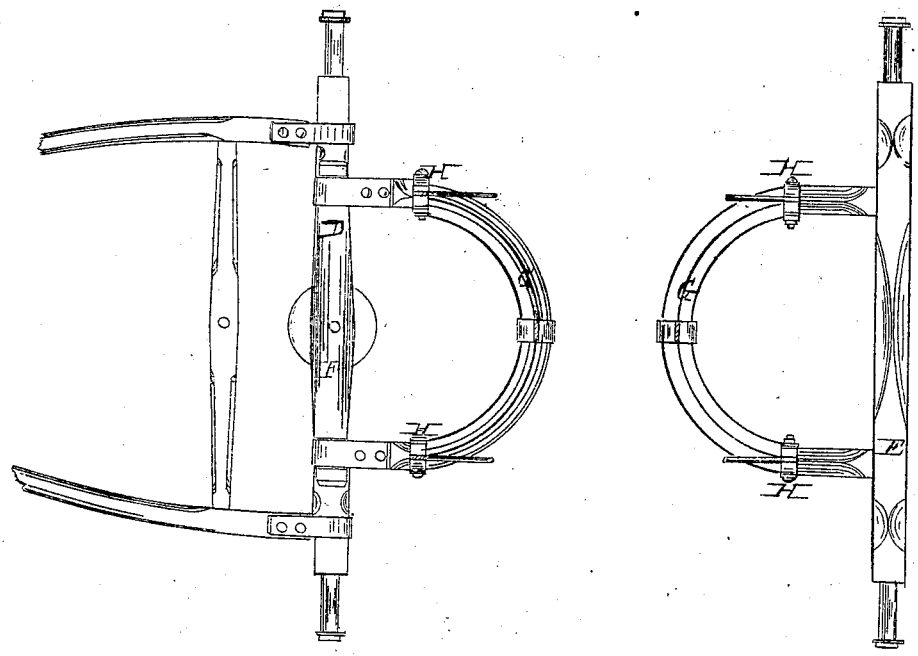

GEORGE A. BLAIR AND A. L. GLADDING, OF JOHNSONBURG, NEW YORK.

Letters Patent No. 73,492, dated January 21, 1868.

---

IMPROVEMENT IN THE MODE OF HANGING CARRIAGE-BODIES.

---

*The Schedule referred to in these Letters Patent and making part of the same.*

---

TO ALL WHOM IT MAY CONCERN:

Be it known that we, G. A. BLAIR and A. L. GLADDING, of Johnsonburg, in the county of Wyoming, and State of New York, have invented a certain new and useful Improvement in Hanging Carriage-Bodies; and we do hereby declare that the following is a full and exact description thereof, reference being had to the accompanying drawings, in which—

Figure 1 is a side elevation of a carriage provided with our improvement, a portion of the body being shown as broken away.

Figure 2 is a horizontal section in plane of line $xx$, fig. 1.

Like letters designate corresponding parts in both figures.

Our invention is designed to dispense with the use of the common steel springs for supporting the bodies of carriages, and to provide a cheaper, more simple, and equally efficient method of hanging them.

The invention consists in supporting the body on two lever-frames, attached at one end, respectively, to the axles, while their inner ends are connected and sustained by an elastic rubber strap or spring passing over bearings arranged beneath the seat, which allows a vertical spring or play to the body, but which prevents any tipping or sagging to either side by a greater weight, or by the contact of the wheel in turning around, which occurs where the body is supported in the ordinary manner.

In the drawings, A represents the body, B the seat, and D E the forward and rear axles of a carriage. To the bolster F are attached the ends of the bow-lever G by means of a strap encircling it, or other suitable device that will allow the lever to turn thereon, shown at $a\,a$, (fig. 2.) A corresponding lever, G', is rigidly fastened to the rear axle. Four legs or standards H H H H are securely fastened to the bottom of the body, and firmly braced, the lower ends of which are pivoted to each side of the frames G G', upon which the body rests. At the centre of the inner and bow-portions of the frames are attached in any suitable manner the ends of a rubber or other elastic band or spring, I, which passes over one or more rollers or bearings, $n\,n$, secured, (preferably,) to the under side of the seat, although they may be fastened to the under side of body with similar effect.

The operation of our improvement is readily perceived: The weight being partially supported by the spring, it yields to the action of the same, permitting the ends of the frame-levers to which it is attached to rise and fall according to the weight sustained and the strength of the spring.

The prominent feature and advantage of our improvement is, that a body supported, as above described, cannot sag or tip to either side by an increased weight, as in getting in the vehicle, or where one of its occupants is much heavier than the other, nor in turning around, where the wheel comes in contact with the side, which, with bodies supported in the ordinary way, frequently causes such a tipping as to render it extremely unpleasant and sometimes dangerous to the occupants. This will readily be perceived from the fact that the sides of the lever-frames G G' are firmly secured together at their inner ends, or bent from a single piece, as represented, so that one side cannot yield or act independent of the other, which they would do if they were disconnected and a spring used for each side, or a separate one for each of the four levers, as in one device already patented.

Another advantage of our improvement is the less liability of the rear axle breaking, as the weight is supported at two points near each wheel instead of at the centre, as in the ordinary method of construction. It also dispenses with the necessity of a reach, is very simple, cheap, and is easily repaired should it get out of order.

The thills are to be secured rigidly to the forward axle. This is necessary in order to maintain the axle and cross-bar in a perpendicular position.

By arranging the bearings $n\,n$ of the circular lever-frames underneath the seat, and near the centre of the carriage-body, the advantage of greater steadiness and regularity of motion in the action of the springs is secured.

What we claim as our invention, is—

Suspending the circular lever-frames G G' on the two pulley-bearings $n\,n$, arranged with relation to the seat B and body A of the carriage by means of the elastic strap I, substantially as and for the purposes set forth.

In witness whereof, we have hereunto signed our names in the presence of two subscribing witnesses.

GEO. A. BLAIR,
A. L. GLADDING.

Witnesses:
JAY HYATT,
ALBERT HAIGHT.